G. W. KINNARD.
BOW HOLDER OR CLAMP FOR VEHICLE TOPS.
APPLICATION FILED JULY 3, 1915.
1,167,082.
Patented Jan. 4, 1916.
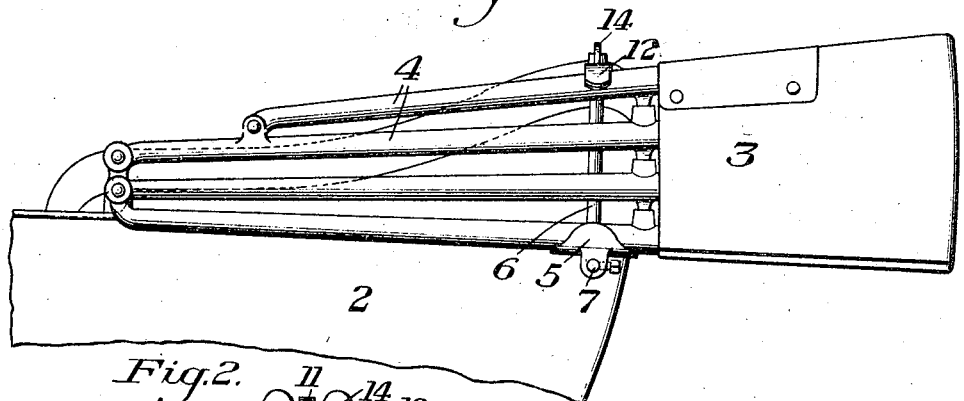
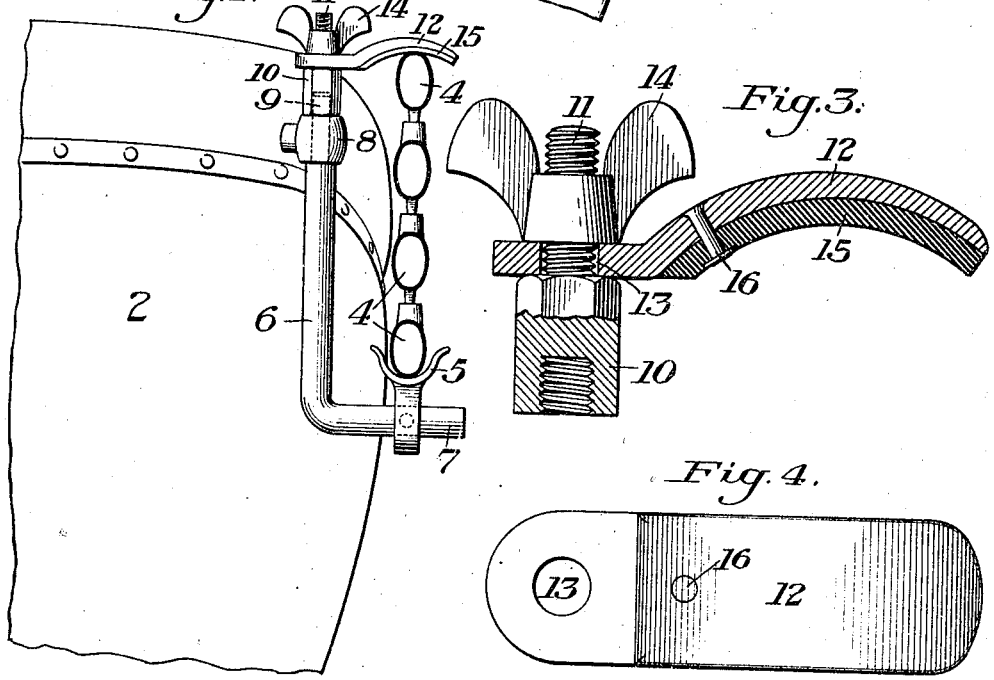
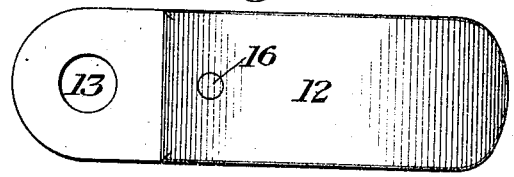
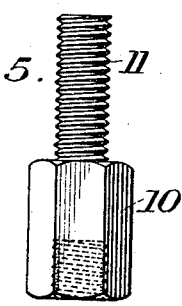
WITNESSES
INVENTOR
Geo. W. Kinnard

UNITED STATES PATENT OFFICE.

GEORGE W. KINNARD, OF CLEVELAND, OHIO.

BOW HOLDER OR CLAMP FOR VEHICLE-TOPS.

1,167,082.  Specification of Letters Patent.  Patented Jan. 4, 1916.

Application filed July 3, 1915. Serial No. 37,967.

*To all whom it may concern:*

Be it known that I, GEORGE W. KINNARD, a citizen of the United States, residing at Cleveland, Cuyahoga county, Ohio, have invented a new and useful Bow Holder or Clamp for Vehicle-Tops, of which the following is a full, clear, and exact description, reference being had to the accompanying drawings, forming part of this specification, in which—

Figure 1 is a side view showing my invention applied to an automobile. Fig. 2 is a view partly in rear elevation and partly in section, of the same, and Figs. 3, 4 and 5 are detail views showing the clamp parts.

My invention has relation to a bow-holder or clamp for holding tops of automobiles or other vehicles in their folded down position.

The invention is designed to provide a simple and inexpensive device of this character which will securely hold the tops without rattling, and which will take the place of the straps usually employed for this purpose.

Referring to the accompanying drawings, in which I have shown the preferred form of my invention, the numeral 2 designates a portion of an automobile body, 3 the top in folded position, and 4 the bows.

5 designates the usual bow rest or support secured to the body of the automobile.

6 is a prop iron having a horizontal arm 7 on which the bow rest 5 is secured, and having its vertical arm secured to the vehicle body by the socket iron 8. The upper threaded end portion 9 of this vertical arm projects above the socket iron 8 and is engaged by a long hexagon nut 10 having an upwardly extending threaded stem 11.

12 is the clamp proper having an opening 13 fitting over the threaded end of the stem 11 and secured by the wing-nut 14 screwed on said stem. The clamp 12 is preferably of the concave form shown, its engaging portion being provided with a lining 15 of leather or other suitable material secured thereto by any suitable means, such as the rivet 16.

To release the top, the wing-nut 14 is loosened and the clamp is swung around out of engagement with the bows 4.

The device form a very simple and convenient one for the purpose.

I claim:

1. A bow-holder, comprising a prop iron having a threaded portion at its upper end, a support through which said threaded portion extends, a nut member engaging said threaded portion and seating on said support, said nut member having an upwardly extending threaded stem, a clamp member engaging said stem, and a securing nut for holding the clamp member, substantially as described.

2. A bow-holder or clamp, comprising a prop iron having a threaded end portion, a support through which said threaded end portion extends, a long nut member having a threaded engagement with said threaded portion and seating upon said support, and also having an upwardly projecting threaded stem, a clamp arm having a concave bow engaging portion, and means for releasably securing the clamp arm on the threaded stem of the nut member, substantially as described.

In testimony whereof, I have hereunto set my hand.

GEO. W. KINNARD.

Witnesses:
JOHN McGRATH,
GEO. F. ERTEL.

Copies of this patent may be obtained for five cents each, by addressing the "Commissioner of Patents. Washington, D. C."